United States Patent Office 3,434,743
Patented Mar. 25, 1969

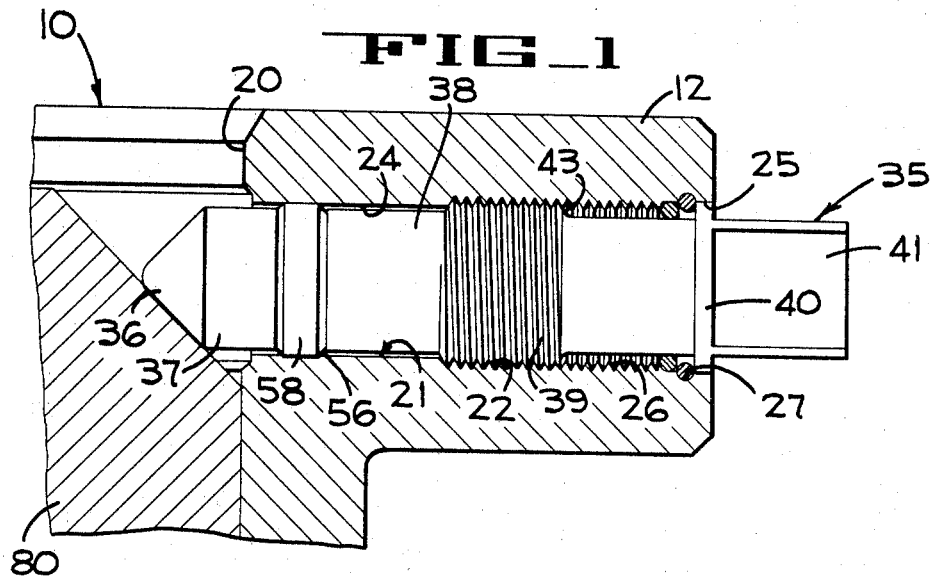
FIG_1
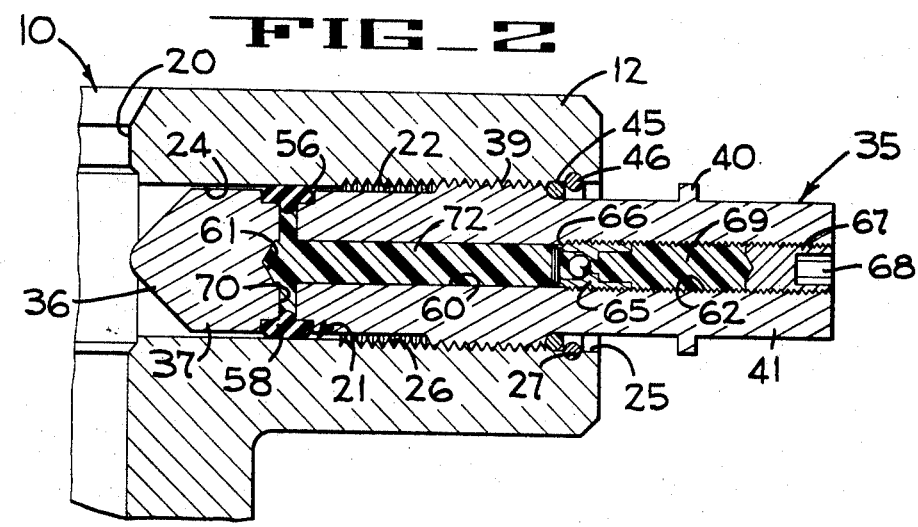
FIG_2

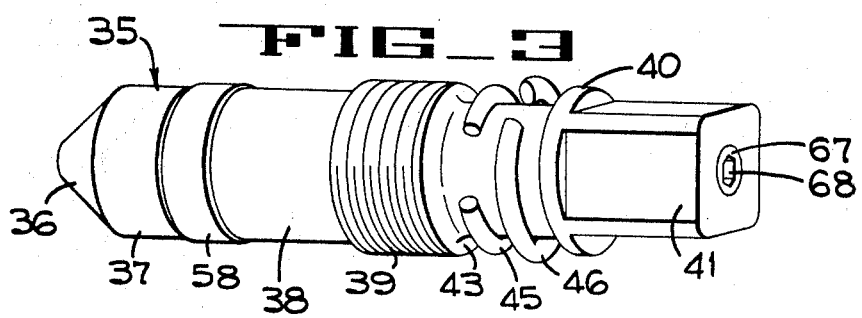
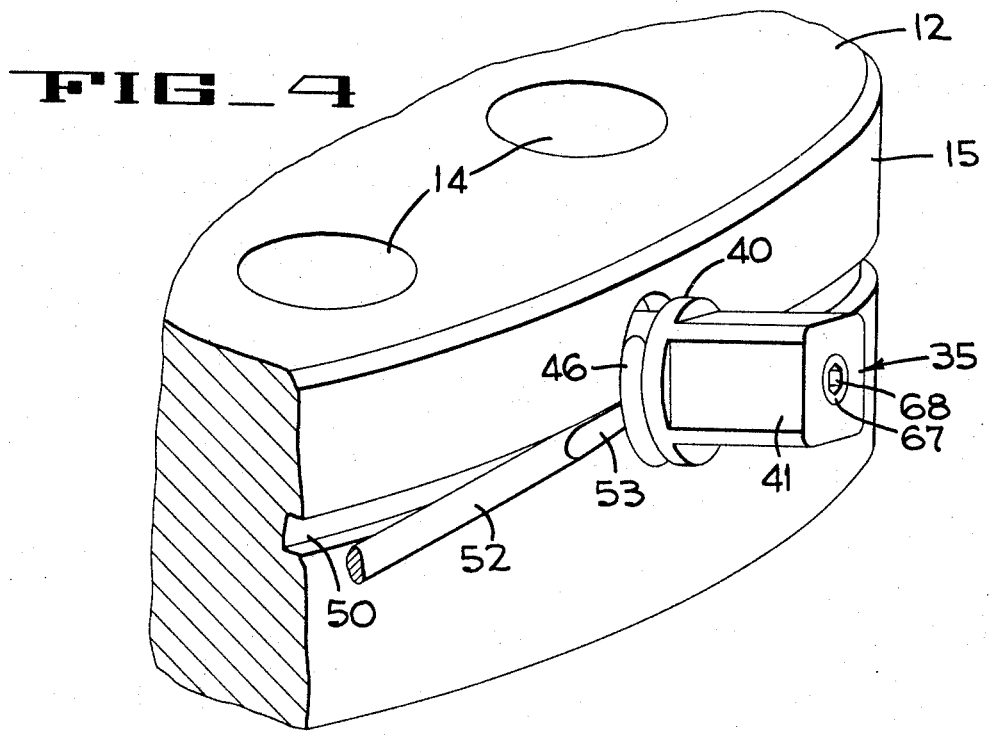
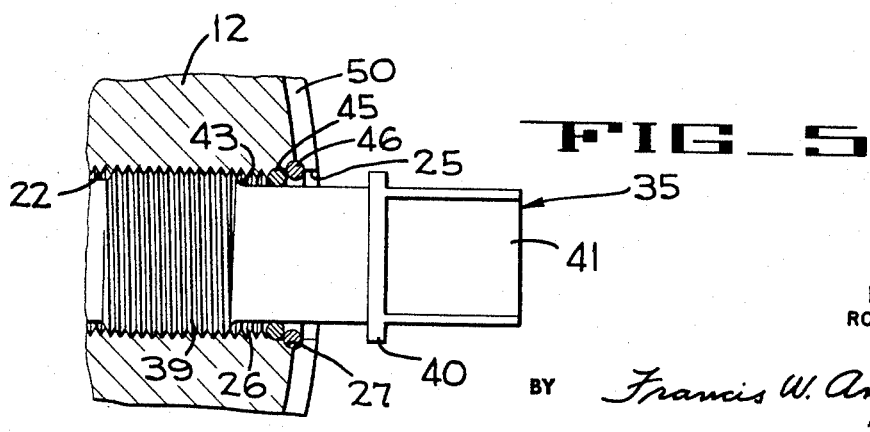

3,434,743
WELL APPARATUS
Roy A. Boeker, Houston, Tex., assignor to FMC Corporation, San Jose, Calif., a corporation of Delaware
Filed July 7, 1966, Ser. No. 563,536
Int. Cl. F16l 35/00; F16b 29/00
U.S. Cl. 285—39      2 Claims

ABSTRACT OF THE DISCLOSURE

A captive-type screw primarily for holding or locking tubing and casing hangers in place of wellheads including a floating ring surrounding and carried by the screw that cooperates with a locking ring held by the wellhead and a pair of spaced annular shoulders on the screw shank to prevent the screw from being inadvertently withdrawn from the wellhead and to limit inward travel of the screw in the wellhead, and a system for providing and maintaining a fluid seal between the screw and the wellhead including a facility for pressurizing and adding additional material to the system for maintaining the seal intact.

---

The present invention pertains to a well apparatus and more particularly to an improved lockdown screw.

As is known, lockdown screws are used to hold tubing hangers in place, to lock down casing hangers, to energize packing, and the like. The present invention solves certain problems existing in the lockdown screws of the prior art. One of these problems has to do with limiting axial movement of the lockdown screw both inward and outward of its bore. Another problem is that of providing an effective seal between the screw and its bore. Further, certain of the prior art screws have lacked adequate strength to withstand the pressures imposed on the screws by the hangers and other devices engaged by the screws.

Accordingly, it is an object of the present invention to provide a lockdown screw which is limited in both its inward and outward travel.

Another object is to provide a lockdown screw which, although limited in both directions of movement, is readily removed from its supporting head.

Another object is to provide a lockdown screw with maximum strength.

Another object is to provide a plastic-actuated seal for a lockdown screw which is limited in the extent of its travel.

Another object is more effectively to isolate the threads of a lockdown screw from well fluids.

These, together with other objects, will become apparent upon reference to the following description and accompanying drawings, in which:

FIGURE 1 is a fragmentary vertical section through a supporting head of a well apparatus and showing a lockdown screw embodying the principles of the present invention, the lockdown screw being shown in a projected position in engagement with a pipe hanger.

FIGURE 2 is a view similar to FIGURE 1 but with the lockdown screw in retracted position.

FIGURE 3 is an isometric view of the lockdown screw of the present invention.

FIGURE 4 is an isometric view of the supporting head and lockdown screw and particularly illustrating the manner in which the lockdown screw is removed from the head.

FIGURE 5 is a fragmentary horizontal section of the head and lockdown screw.

Referring more particularly to the drawings, a supporting wellhead is partially illustrated and is identified by the numeral 10. This head has a flange 14 which is generally disposed in a horizontal position and which includes a plurality of bolt holes 14 and a generally circular peripheral surface 15.

The supporting head 10 has a longitudinal bore 20 and a plurality of transverse bores 21 projecting radially outward from the longitudinal bore through the flange 12. Each transverse bore thus has an inner end communicating with the longitudinal bore and an outer end opening exteriorly of the flange. With particular reference to FIGURE 1, each transverse bore is surrounded by a cylindrical wall 22 of the flange, this wall having an inner smooth portion 24, an outer portion 25, and threads 26 between the inner and outer portions. Further, the outer portion has an annular groove 27 therein which surrounds the transverse bore.

A lockdown screw embodying the features of the present invention is generally identified by the number 35. One of these lockdown screws is positioned in each of the transverse bores 21. Each screw has a generally conical inner tip 36, a cylindrical inner portion 37, a cylindrical intermediate portion 38, threads 39 between said inner and outer portions and in threaded engagement with the threads 26 on the flange 12, a circular rim 40 projecting radially from the intermediate portion 38, and a wrench portion 41 having a plurality of flats projecting axially from the rim. The threads 39 have an outer shoulder 43 in opposed spaced relation to the rim.

The lockdown screw 35 is movable between an inner projected position with its tip 36 projecting into the longitudinal bore 20 and with the rim 40 within its transverse bore 21 and generally flush with the peripheral surface 15, and a retracted position with said tip 36 substantially entirely withdrawn from the longitudinal bore. In order to limit travel of the lockdown screw in both directions, a resiliently diametrically expandable floating ring 45 is positioned around the intermediate portion 38 and a resiliently diametrically contractible locking ring 46 is fitted in the groove 27. The inside diameter of the locking ring, as it is positioned in the groove, is less than the outside diameter of the floating ring in its position around the lockdown screw. Furthermore said inside diameter of the locking ring is less than the outside diameter of the rim 40. Also, the inside diameter of the floating ring is less than the outside diameter of the shoulder 43 on the threads. Therefore, inward movement of the screw is limited by engagement of the rim with the locking ring, as illustrated in FIGURE 1. Outward movement of the screw is limited by engagement of the shoulder 43 with the floating ring when the latter is in engagement with the locking ring, as illustrated in FIGURE 2.

In order to enable removal of each lockdown screw 35 outward from the flange 12, the flange is provided with an annular open channel 50 which intersects each transverse bore 21 and the groove 27 associated with each tarnsverse bore. It is thus evident that the locking ring 46, although principally disposed in the groove 27, is partially positioned in the channel. In order to remove the lockdown screw from its transverse bore 21, the screw is threaded outward until the rim 40 is spaced from peripheral surface 15 by a distance at least equal to the width of the locking ring 46. A removing tool 52 is then placed in the channel and its tapered end 53 is wedged between the base of the channel and the locking ring in order to pry the ring out of the groove. When the locking ring has been removed, the screw can be threaded out of the transverse bore since the floating ring does not impede such movement. The screw is repositioned in its bore by following a reverse procedure.

To effect a seal between the screw 35 and the flange 12, the inner portion 37 of each screw has a groove 56, and an annular seal 58 is positioned within this groove.

As shown in FIGURE 2, the lockdown screw 35 has an axial bore 60 which is provided with a closed inner end 61 and an outer threaded portion 62 opening through the wrench portion 41 of the screw. A check valve 65 is threaded in the portion 62 against a shoulder 66 of the bore, and an injector plug 67 is threaded in this portion 62 in spaced relation to the check valve, the plug having an outwardly opening, wrench-receiving socket 68. A stick 69 of extrudable plastic material is positioned in the bore 60 between the check valve and the plug. The screw also has a plurality of radial passages 70 providing communication between the axial bore 60 and the groove 56. By threading the plug inward of the bore, plastic material 72 is extruded from the stick through the check valve and along the bore and into the radial passages thereby to exert pressure outward against the seal 58 and to maintain the seal in fluid-tight engagement with the portion 24 of the wall 22. Whenever it is desired to increase the sealing effect between the seal and the wall, the plug is threaded in farther to extrude more plastic and to increase the radial pressure on the seal. If necessary, a new stick of plastic material can be inserted in the bore between the check valve and the plug. The check valve, of course, operates to prevent return flow of plastic material. It will be noted that the seal isolates the threads 39 from well fluids in bore 20.

In use, if it is desired to lock down a pipe hanger 80, for example, the hanger is set in the head with the lockdown screw 35 in its retracted position, as shown in FIGURE 2. The screw is then threaded inward until the tip 36 is in appropriate engagement with the hanger, as illustrated in FIGURE 1. Inward movement of the screw stops when the rim 40 engages the locking ring 46. At this time, the transverse bore 21 is closed so as to minimize entry of dirt into the transverse bore. Furthermore, the rim serves to support the intermediate portion 38 of the screw by virtue of engagement of the rim with the wall 22 of the transverse bore. Thus the screw has considerable strength and is able to withstand high pressures which are imposed on the screw through the casing hanger.

When it is desired to remove the hanger 80 from the supporting head 10, the screw 35 is unthreaded; the screw is in completely retracted position when the shoulder 43 forces the floating ring 45 into engagement with the locking ring 46 thereby precluding inadvertent removal of the screw from the transverse bore 21 or movement of the seal 58 from the inner smooth portion 24 against the threads 26 which might cause damage to the seal.

Although a preferred embodiment of the present invention has been shown and described, it will be understood that various changes and modifications may be made in the details thereof without departing from the spirit and the scope of the appended claims.

What is claimed is:
1. In a well apparatus including a support having a longitudinal bore and a transverse bore, said transverse bore having an inner end communicating with the longitudinal bore and an outer end opening exteriorly of the support, said support having a wall surrounding said transverse bore, said wall having a groove therein circumscribing said transverse bore and an interiorly threaded portion between said groove and said inner end, said support having a locking ring-removing channel opening exteriorly of said support and intersecting said transverse bore and said groove;

a lockdown screw mounted in said transverse bore for movement axially thereof, said screw including
an inner end,
an outer end,
a shank intermediate said ends, said shank having an exteriorly threaded portion between said ends,
a seal mounted on and surrounding said shank between the inner end of said screw and the exteriorly threaded portion to provide a fluid barrier between said wall and said screw and thereby isolate said interiorly and exteriorly threaded portions from well fluids,
a radially projecting annular rim between said exteriorly threaded portion and said outer end of the screw, said rim restraining said screw against significant radial movement when said screw is in its innermost position in said transverse bore,
a shoulder spaced between the exteriorly threaded portion and the rim, said shoulder having a predetermined outside diameter, and
a resiliently diametrically expandable split floating ring of generally circular cross-section fitted on said screw between said shoulder and said rim and being movable axially of the screw, said floating ring having an inside diameter less than the outside diameter of the shoulder; and
a resiliently diametrically contractible split locking ring of generally circular cross-section fitted in said groove and having an inside diameter less than the outside diameter of the floating ring and less than the outside diameter of the rim, whereby inward movement of said screw is limited by engagement of said rim with said locking ring, and outward movement of said screw is limited by engagement of said floating ring with said shoulder and said locking ring.

2. A lockdown screw primarily for holding pipe hangers in a wellhead, comprising:
an elongated and generally cylindrical shank having an inner end adapted for applying a position-holding pressure on a slanting surface of a pipe hanger in a wellhead, and an outer end adapted for the application of a rotational torque to the screw;
an exteriorly threaded portion on said shank intermediete said inner and outer ends;
a seal mounted on and surrounding said shank between the inner end of said screw and the exteriorly threaded portion to provide a fluid barrier between said screw and a cooperating bore in which it is threaded and thereby isolate said threaded portion from said inner end;
a radially projecting annular rim spaced from said threaded portion towards said outer end, said rim providing means for restraining said screw against significant radial movement when said screw is in its innermost position in said coperating bore;
a shoulder extending radially outward from said shank adjacent that part of said threaded portion nearest said rim;
a resiliently diametrically expandable split floating ring of generally circular cross-section circumscribing said shank between said shoulder and said rim, said ring having an inside diameter less than the outside diameter of said shoulder and being slidable axially of the shank; and a resiliently diametrically contractible split locking ring of generally circular cross-section circumscribing said shank between said floating ring and said rim, said locking ring having an inside diameter less than the outside diameter of said floating ring and said rim, whereby when said locking ring is held stationary movement of said screw axially towards its inner end is limited by engagement of said rim with said locking ring, and movement of said screw axially towards its outer end is limited by engagement of said floating ring with said shoulder and said locking ring.

References Cited

UNITED STATES PATENTS

| | | | |
|---|---|---|---|
| 2,709,091 | 5/1955 | Rector | 285—140 |
| 2,746,773 | 5/1956 | Bily | 285—117 |
| 2,798,747 | 7/1957 | Auer | 285—142 X |
| 2,848,255 | 8/1958 | Klein et al. | 285—321 X |
| 2,935,343 | 5/1960 | Ellis | 285—321 X |
| 3,072,420 | 1/1963 | Lebeaux et al. | 285—143 X |
| 3,166,345 | 1/1965 | Pinkard | 285—142 X |
| 3,221,794 | 12/1965 | Acres | 85—8.8 X |
| 3,339,832 | 9/1967 | Duecker | 285—301 X |
| 3,343,581 | 9/1967 | Martin et al. | 151—69 |

FOREIGN PATENTS 180,590  9/1962  Sweden.

CARL W. TOMLIN, *Primary Examiner.*

D. AROLA, *Assistant Examiner.*

U.S. Cl. X.R.

85—1; 151—69; 285—140, 297, 321, 347